(12) United States Patent
Sylla et al.

(10) Patent No.: US 8,544,278 B2
(45) Date of Patent: Oct. 1, 2013

(54) TURBOSHAFT ENGINE WITH REDUCED NOISE EMISSION FOR AIRCRAFT

(75) Inventors: Amadou André Sylla, Toulouse (FR); Franck Crosta, Leguevin (FR); Olivier Pelagatti, Toulouse (FR); Damien Prat, Colomiers (FR)

(73) Assignee: Airbus Operations (SAS), Toulouse (FR)

( * ) Notice: Subject to any disclaimer, the term of this patent is extended or adjusted under 35 U.S.C. 154(b) by 890 days.

(21) Appl. No.: 12/673,042

(22) PCT Filed: Aug. 4, 2008

(86) PCT No.: PCT/FR2008/001166
§ 371 (c)(1),
(2), (4) Date: Feb. 11, 2010

(87) PCT Pub. No.: WO2009/053555
PCT Pub. Date: Apr. 3, 2006

(65) Prior Publication Data
US 2012/0117939 A1    May 17, 2012

(30) Foreign Application Priority Data
Aug. 17, 2007    (FR) ..................................... 07-05875

(51) Int. Cl.
*F02K 1/46*    (2006.01)
(52) U.S. Cl.
USPC ........... 60/770; 60/264; 239/265.19; 181/220

(58) Field of Classification Search
USPC ...... 60/262, 264, 770; 239/265.19; 181/213, 181/220
See application file for complete search history.

(56) References Cited

U.S. PATENT DOCUMENTS

| | | | | |
|---|---|---|---|---|
| 2,486,019 A * | 10/1949 | Goddard | ........................ | 60/264 |
| 2,974,744 A * | 3/1961 | Wade | ............................ | 181/220 |
| 3,161,257 A * | 12/1964 | Young | ........................... | 181/219 |
| 4,284,170 A | 8/1981 | Larson et al. | | |
| 4,786,016 A | 11/1988 | Presz, Jr. et al. | | |
| 6,082,632 A | 7/2000 | Clark et al. | | |
| 6,360,528 B1 | 3/2002 | Brausch et al. | | |
| 7,406,821 B2 * | 8/2008 | Hervio | ............................ | 60/770 |
| 7,735,601 B1 * | 6/2010 | Stieger et al. | ................. | 181/213 |
| 8,307,659 B2 * | 11/2012 | Rose et al. | ..................... | 60/770 |
| 2003/0159428 A1 | 8/2003 | Hebert | | |
| 2004/0074224 A1 | 4/2004 | Hebert | | |
| 2005/0138915 A1 | 6/2005 | Bardagi et al. | | |
| 2006/0283188 A1 * | 12/2006 | Webster et al. | ................. | 60/770 |

FOREIGN PATENT DOCUMENTS

| | | |
|---|---|---|
| EP | 1703114 | 9/2006 |
| GB | 2160265 | 12/1985 |

* cited by examiner

*Primary Examiner* — Ted Kim
(74) *Attorney, Agent, or Firm* — Novak Druce Connolly Bove + Quigg LLP

(57) ABSTRACT

According to the invention, a plurality of embossments (20) having a rectangular section is provided at the inner periphery of the outlet opening (7) of the fan duct (12), said embossments being separated by longitudinal channels (21) having a convergent (22C) and a divergent (22D) for the cold flow (9).

3 Claims, 4 Drawing Sheets

US 8,544,278 B2

TURBOSHAFT ENGINE WITH REDUCED NOISE EMISSION FOR AIRCRAFT

CROSS-REFERENCE TO RELATED APPLICATIONS

This application is a §371 national stage entry of International Application No. PCT/FR2008/001166, filed Aug. 4, 2008, which claims priority to French Patent Application 0705875, filed Aug. 17, 2007, the entire contents of which are incorporated herein by reference.

FIELD OF THE INVENTION

The present invention relates to a turbojet engine with reduced noise emissions for an aircraft.

BACKGROUND OF THE INVENTION

It is known that, at the rear of a bypass turbojet engine mounted on an aircraft, the supersonic cold flow, flowing in the downstream direction of said turbojet engine, comes into contact with the exterior aerodynamic airstream of said turbojet engine. Since the speeds of said cold flow and of said airstream differ from one another, this results in inter-penetrating fluidic shear, which generates noise, known in aeronautical parlance as "jet noise".

In addition, as a result of a discontinuity in static pressure between the external pressure and the pressure at the exit from the jet pipe, this supersonic cold flow gives rise to a series of compression-expansion (speed fluctuation) cells which act as noise amplifiers and produce a noise known in aeronautical parlance as "shock cell noise", this English-language term "shock cell noise" being widely recognized.

In order to attenuate the noise emitted at the rear of a bypass turbojet engine, the idea of modifying the rear part of the cold flow nozzle has already been actioned. For example, extending said nozzle rearward using "chevrons" (see, for example, U.S. Pat. Nos. 4,284,170 and 6,360,528) or shaping the rear part of said nozzle in the form of "undulating lobes" (see, for example, GB 2 160 265, U.S. Pat. Nos. 4,786,016 and 6,082,635) have already been proposed.

Aside from the fact that these known nozzles demand definitive special shapes which in general increase the cost, mass and drag, it should be pointed out that, although they are effective in attenuating jet noise by creating turbulence that encourages the cold flow and the exterior aerodynamic airstream to mix, they have only a very limited effect in reducing shock cell noise.

Another source, document EP-1 703 114, describes a reduced-noise turbojet engine in which a plurality of bosses are distributed at the periphery of the outlet orifice of the cold flow, projecting into the latter, each of said bosses forming a convergent followed by a divergent connected to the edge of said cold flow outlet orifice.

SUMMARY OF THE INVENTION

It is an object of the present invention to improve such bosses to allow not only an attenuation in jet noise but also a reduction in shock cell noise.

To this end, according to the invention, the bypass turbojet engine for an aircraft, comprising, around its longitudinal axis:

a nacelle provided with a nacelle outer cowl and containing a fan generating the cold flow and a central generator generating the hot flow;

an annular cold flow duct created around said central hot flow generator;

a fan outer cowl delimiting said annular cold flow duct on said nacelle outer cowl side;

a cold flow outlet orifice of which the edge, which forms the trailing edge of said nacelle, is determined by said nacelle outer cowl and by said fan outer cowl converging toward one another until they meet; and in the vicinity of said cold flow outlet orifice, a plurality of bosses distributed at the periphery of said fan outer cowl, projecting into said annular cold flow duct and forming, for said cold flow, a convergent face portion followed by a divergent face portion connected to the edge of said cold flow outlet orifice, is notable in that each boss has a convex face forming said convergent face portion and said divergent face portion and two planar lateral faces, which run longitudinally with respect to said turbojet engine, said convex face and said lateral faces giving said boss an at least approximately rectangular cross section that evolves in a direction parallel to said longitudinal axis.

By virtue of the present invention, the periphery of said cold flow is subjected, at the exit of the corresponding nozzle, to division into distinct jets with different orientations and different structures according to whether said jets pass over the bosses or through the longitudinal ducts between said bosses. Specifically, the cold flow jets passing along said longitudinal ducts have a direction that extends said outer fan cowl and, at the edge of said cold flow outlet orifice, have an acceleration of magnitude equal to the nominal magnitude for the nozzle. By contrast, the cold flow jets that pass over the bosses are directed outward, extending said divergent face portion, and penetrate the aerodynamic airstream around the turbojet engine. In addition, at the edge of said cold flow outlet orifice, they have an acceleration vastly superior to said nominal acceleration because of the greater expansion caused by said bosses.

Furthermore, because of the presence of said planar lateral faces, a great deal of shear is generated between the cold flow jets passing over the bosses and those running along said longitudinal ducts, thus causing the formation of vortices that encourage mixing between the exterior aerodynamic airstream and said cold flow. The orientation of said planar lateral faces may, for example, be radial with respect to said turbojet engine.

Thus, said bosses according to the present invention:

introduce radial heterogeneity into the pressure field of the cold flow at the outlet of the fan nozzle, that is to say locally disorganize the structure of said cold flow, causing, at the rear of the turbojet engine, a reduction in the intensity of the shock cells and therefore in the amplitude of the speed fluctuations; and, at the same time, encourage mixing between the cold flow and the aerodynamic airstream around the turbojet engine, leading to a reduction in jet noise.

The bosses according to the present invention therefore are able simultaneously to influence both the turbulence (the source of noise) and the shock cells (which amplify this noise).

For preference, said bosses are uniformly distributed at the periphery of said fan outer cowl. They may also have a peripheral width equal to that of said longitudinal ducts.

Said bosses may be configured with said outer fan cowl in order to form an integral part thereof. However, advantageously, said bosses are components that are added on and attached to said outer fan cowl. Thus it is possible according to the invention to improve not only turbojet engines that are in the process of being manufactured, but also those built earlier.

BRIEF DESCRIPTION OF THE DRAWINGS

The figures of the attached drawing will make it easy to understand how the invention may be embodied. In these figures, identical references denote elements that are similar.

DETAILED DESCRIPTION

Figure 1:
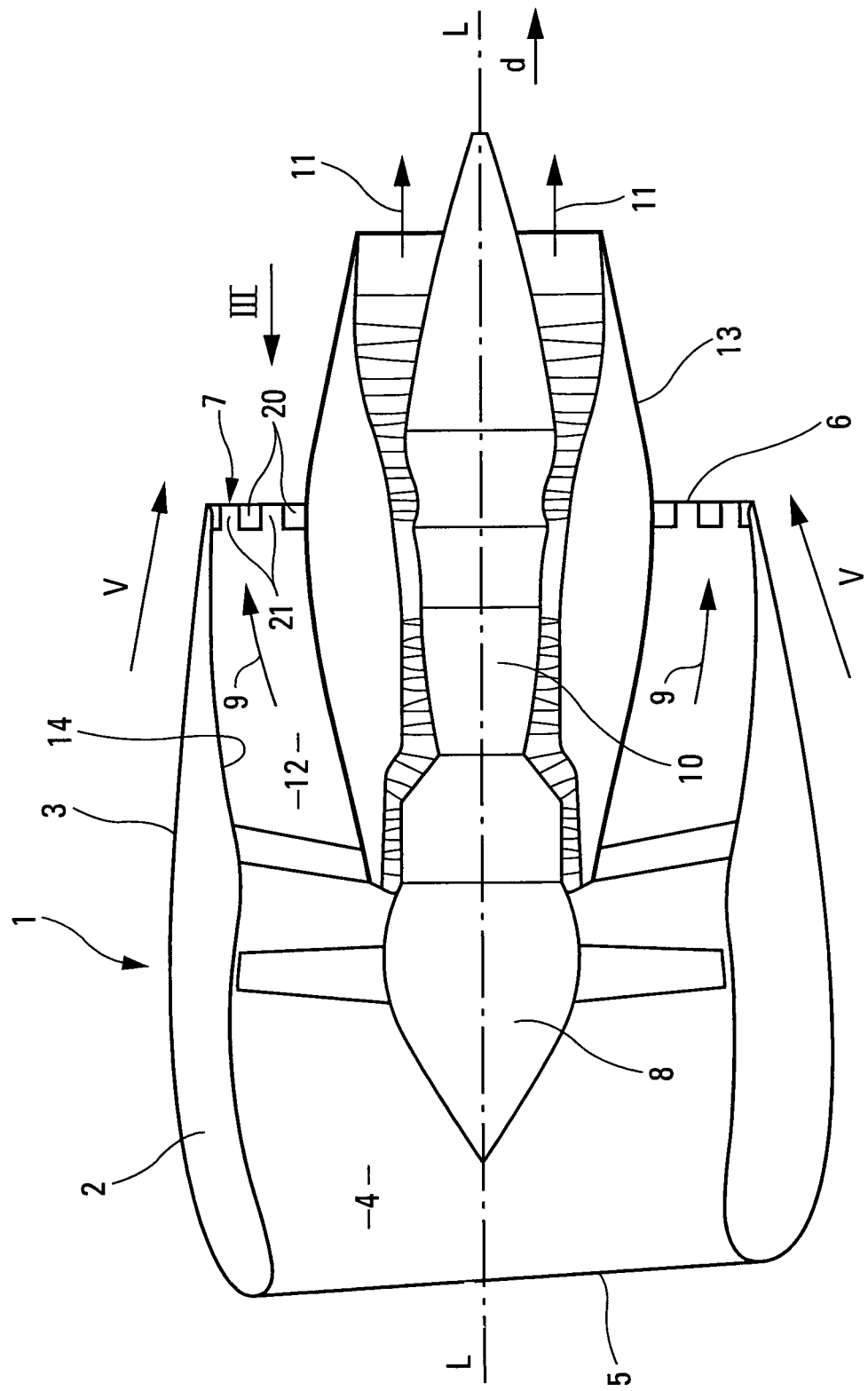
FIG. 1 depicts, in schematic axial section, an improved turbojet engine according to the present invention.

The bypass turbojet engine 1 of longitudinal axis L-L and shown in FIG. 1, comprises a nacelle 2 externally delimited by an outer nacelle cowl 3.

The nacelle 2 comprises, at the front, an air inlet 4 provided with a leading edge 5 and, at the rear, an air outlet orifice 6 provided with a trailing edge 7.

Positioned inside said nacelle 2 are:
- a fan 8 directed toward the air inlet 4 and able to generate the cold flow 9 for the turbojet engine 1;
- a central generator 10 comprising, in the known way, low-pressure and high-pressure compressors, a combustion chamber and low-pressure and high-pressure turbines, and generating the hot flow 11 of said turbojet engine 1; and
- an annular cold flow duct 12, created around said central generator 10, between an inner fan cowl 13 and an outer fan cowl 14.

The outer fan cowl 14 forms a nozzle for the cold flow and converges, toward the rear of the turbojet engine 1, toward said outer nacelle cowl 3, in order therewith to form the edge 7 of said orifice 6, which therefore constitutes the cold flow outlet orifice.

In the vicinity of said cold flow 9 outlet orifice 6, the turbojet engine 1 comprises a plurality of bosses (see also FIGS. 2 and 3) uniformly distributed at the periphery of the outer fan cowl 14. The bosses 20 project into the annular cold flow duct 12 and between them delimit longitudinal ducts 21. For preference, the bosses 20 are components which are added on and attached to said outer fan cowl 14 by any known means (not depicted) such as welding, bolting, etc.

Each boss 20 has a convex face 22 forming, for the cold flow 9, a convergent face portion 22C directed forward followed by a divergent face portion 22D directed rearward. In addition, the rear part of each divergent face portion 22D is connected to the trailing edge 7 of the orifice 6.

Figure 2:
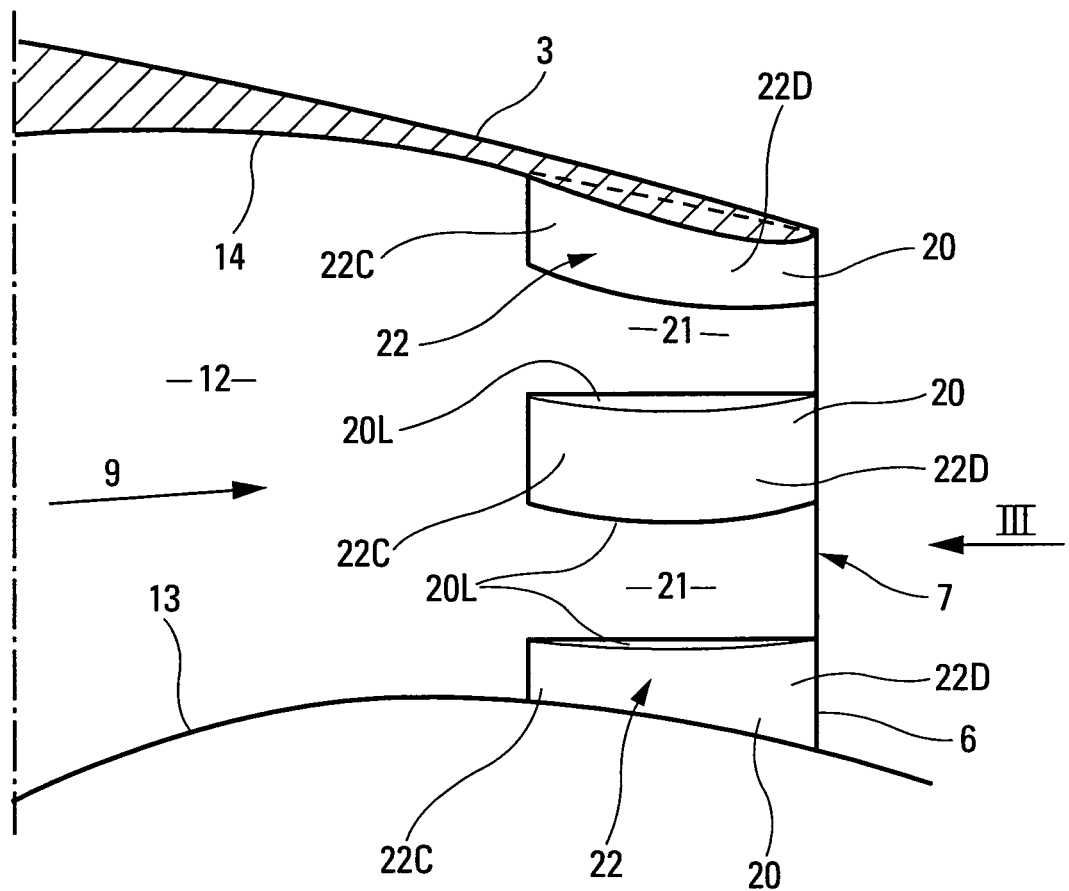
FIG. 2 illustrates, in an enlarged partial schematic view, the rear part of the cold flow nozzle of the turbojet engine of FIG. 1.
Figure 3:
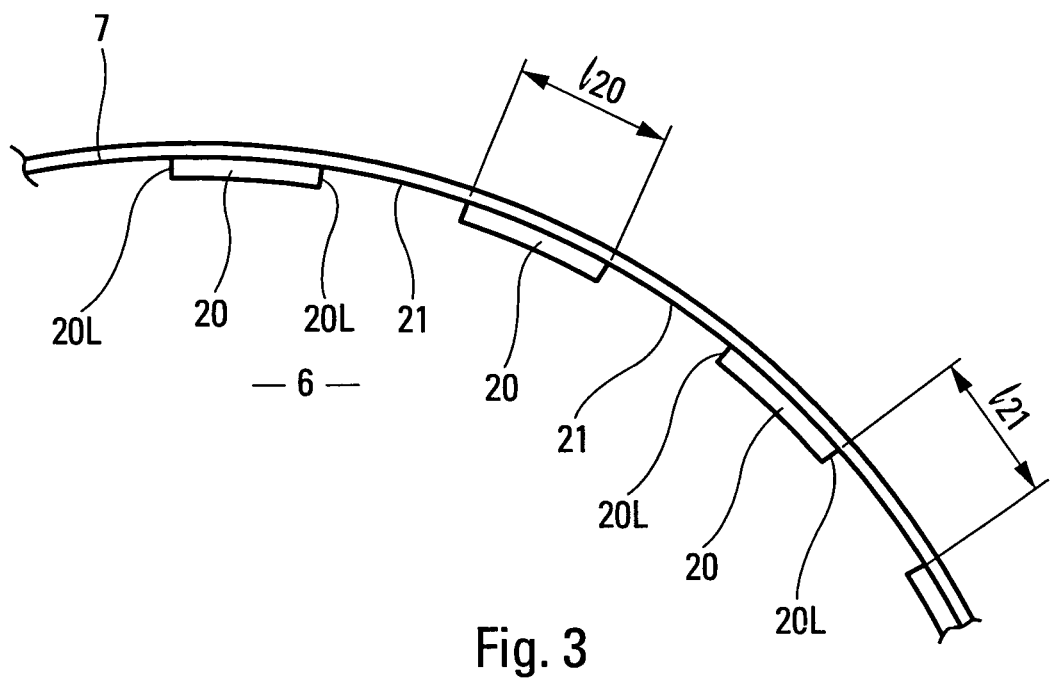
FIG. 3 is a schematic and partial view from the rear of the nozzle of FIG. 2, viewed in the direction of arrow III of FIGS. 1 and 2.

As may be seen in FIGS. 2 and 3, each boss 20 comprises two planar lateral faces 20L running longitudinally with respect to the turbojet engine 1, and the convex face 22 and said lateral faces 20L give each boss 20 an at least approximately rectangular cross section that evolves in a direction parallel to said longitudinal axis L-L.

The planar lateral faces 20L may be radial, that is to say then that their planes pass through said longitudinal axis L-L. In addition, the peripheralwidth 120 of the bosses 20 may be equal to the peripheral width 121 of the longitudinal ducts 21.

Figure 4:
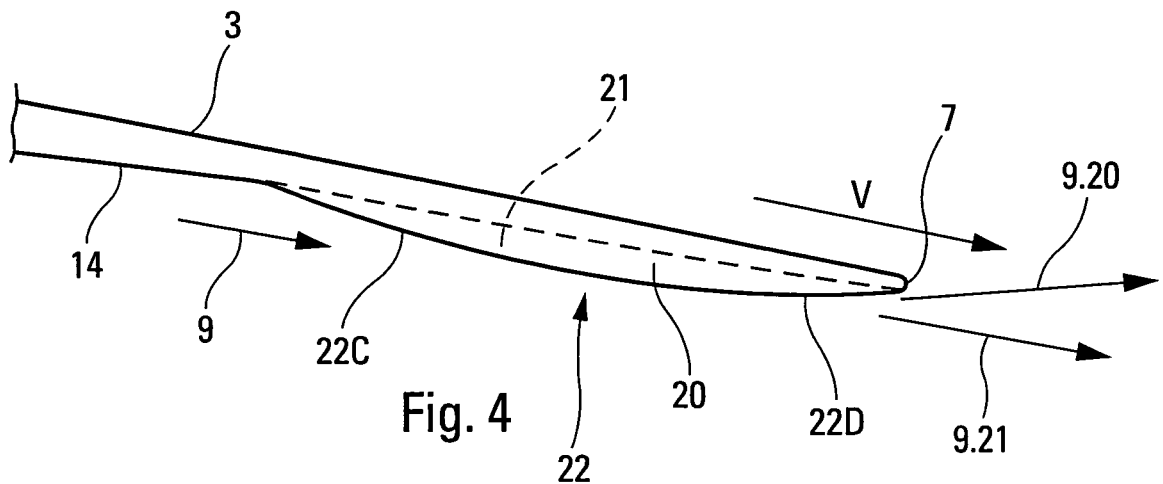
FIG. 4 schematically illustrates the process whereby the bosses according to the present invention improve the mixing of flow at the outlet from the cold flow nozzle.

When the aircraft (not depicted) which bears the turbojet engine 1 moves along, an aerodynamic airstream V flows around the nacelle 2, in contact with the outer nacelle cowl 3 (see FIGS. 1 and 4). Furthermore, as illustrated by FIG. 4, at the periphery of the cold flow 9, jets 9.20 of this flow pass over the bosses 20, whereas other jets 9.21 of said cold flow pass between said bosses, along the longitudinal ducts 21.

Of course, at the outlet of the trailing edge orifice 6, the jets 9.21 are directed in the continuation of the outer fan cowl 14, whereas the jets 9.20 are directed as a continuation of the divergent face portions 22D of the bosses 20. Thus, jets 9.20 cross the aerodynamic airstream V more rapidly than do the jets 9.21. This results in better penetration of the cold flow 9 in the aerodynamic airstream V, and therefore in better mixing of the latter with said cold flow 9. Jet noise is therefore reduced.

Figure 5:
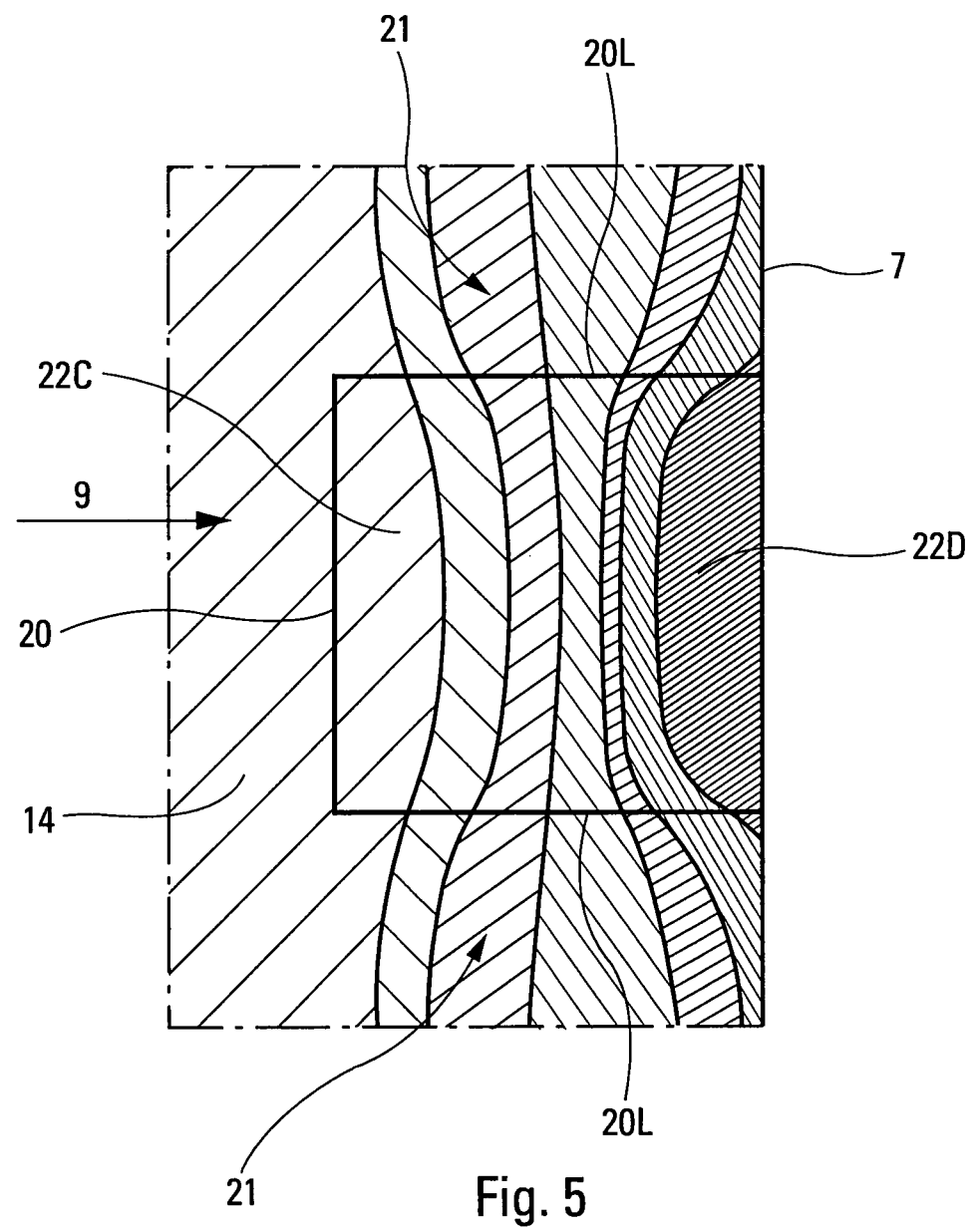
FIG. 5 schematically illustrates the process whereby the bosses according to the present invention destructure the cold flow.

Furthermore, as illustrated by FIG. 5, the jets 9.20 of the cold flow 9 passing over the convergent and divergent face portions 22C-22D have, at the trailing edge 7, an acceleration vastly superior to that of the jets 9.21 35 passing along the longitudinal ducts 21, between the bosses 20. FIG. 5 depicts in plan view a boss 20 with the outer fan cowl 14 part surrounding it, and hatched regions of iso-acceleration of the cold flow 9 (these regions of iso-acceleration are the result of testing and the higher the acceleration, the darker the region).

The difference in acceleration of the jets 9.20 and 9.21 at the outlet from the orifice 6 means that, at least at the periphery, the cold flow 9 is destructured, which means that the noisy shock cells are reduced.

Figure 6:
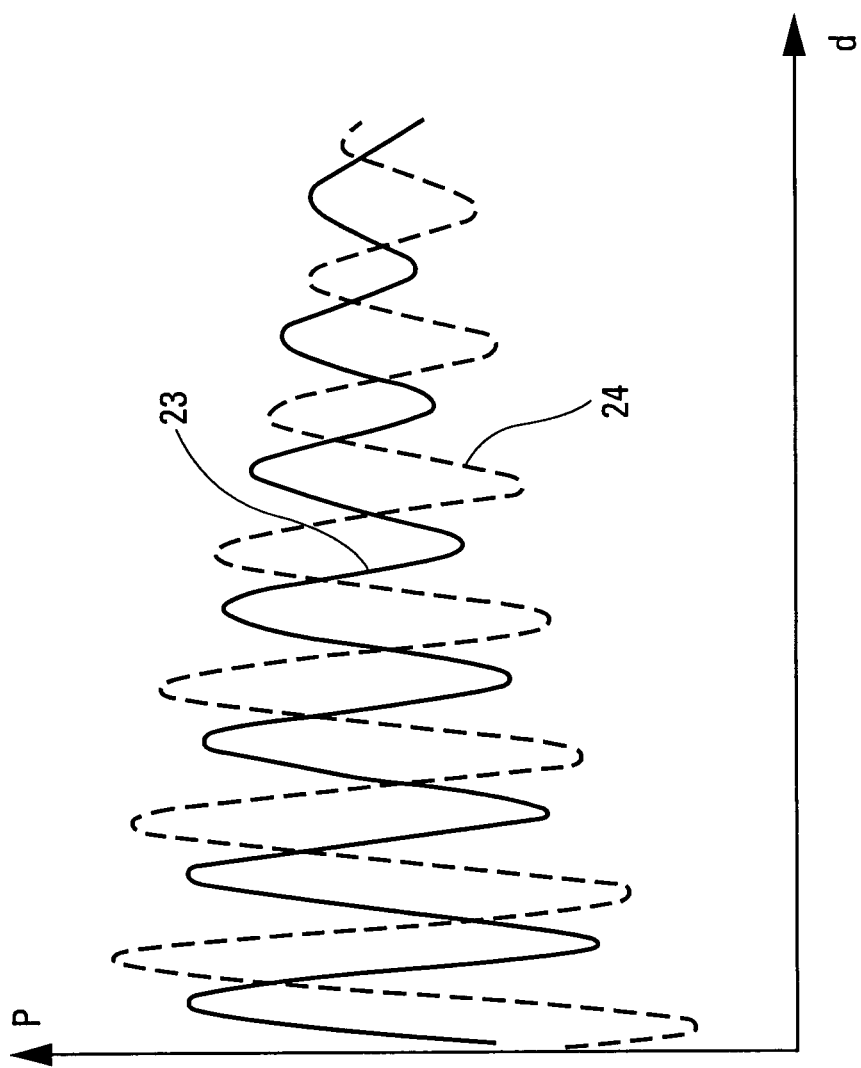
FIG. 6 is a diagram indicating, for a known engine and for this same known engine improved in accordance with the invention, the variation in pressure P at the rear of said engine, as a function of the distance d along the axis thereof.

This consequence is illustrated by FIG. 6.

This FIG. 6 depicts the results of tests on a turbojet engine fitted to a long-haul airplane. This FIG. 6 is a diagram indicating the fluctuations in pressure P at the rear of the turbojet engine, as a function of the distance d therefrom.

Curve 23 shown in solid line in FIG. 6 corresponds to said turbojet engine improved in accordance with the invention by attaching 36 evenly distributed bosses 20 at the periphery of the outlet orifice of its outer fan cowl so as to provide that same number of longitudinal ducts 21, with the same peripheral width of said bosses, each of the latter having a length of the order 200 mm.

By contrast, curve 24 shown in broken line in FIG. 6 corresponds to the same turbojet engine not improved in accordance with the invention.

By comparing curves 23 and 24 it may be seen that the present invention provides an approximately 20% reduction in the amplitude of these pressure fluctuations.

The invention claimed is:

1. A bypass turbojet engine for an aircraft, comprising, around its longitudinal axis (L-L):
    a nacelle (2) provided with a nacelle outer cowl (3) and containing a fan (8) generating the cold flow (9) and a central generator (10) generating the hot flow (11);
    an annular cold flow duct (12) created around said central hot flow generator (10);
    a fan outer cowl (14) delimiting said annular cold flow duct (12) on said nacelle outer cowl (3) side;
    a cold flow outlet orifice (6) of which the edge (7), which forms the trailing edge of said nacelle (2), is determined by said nacelle outer cowl (3) and by said fan outer cowl (14) converging toward one another until they meet; and in the vicinity of said cold flow outlet orifice (6), a plurality of bosses (20) distributed at the periphery of said fan outer cowl (14), projecting into said annular cold flow duct (12) and forming, for said cold flow (9), a convergent face portion followed by a divergent face portion connected to the edge (7) of said cold flow outlet orifice (6), wherein each boss (20) has a convex face (22) forming said convergent face portion (22C) and said divergent face portion (22D) and two planar lateral faces (20L), which run longitudinally with respect to said turbojet engine, said convex face (22) and said lateral faces (20L) giving said boss (20) an at least approximately rectangular cross section that evolves in a direction parallel to said longitudinal axis (L-L), wherein a peripheral width (120) of the bosses (20) is equal to a peripheral width (121) of a plurality of longitudinal ducts (21) delimited between the bosses (20).

2. The turbojet engine as claimed in claim 1, wherein said bosses (20) are uniformly distributed at the periphery of said fan outer cowl (14).

3. The turbojet engine as claimed in claim 1, wherein said bosses (20) are components that are added on and attached to said outer fan cowl (14).

\* \* \* \* \*